United States Patent
Kadowaki et al.

(10) Patent No.: US 6,283,106 B1
(45) Date of Patent: *Sep. 4, 2001

(54) CONTROL APPARATUS FOR INTERNAL COMBUSTION ENGINE

(75) Inventors: Hisashi Kadowaki, Chita-gun; Kenji Yamamoto, Anjo, both of (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,098

(22) Filed: Nov. 15, 1999

(30) Foreign Application Priority Data

Sep. 11, 1997 (JP) .................................. 9-246967
Oct. 6, 1997 (JP) .................................. 9-272430

(51) Int. Cl.⁷ .................................................. F02B 41/00
(52) U.S. Cl. ............................................................ 123/674
(58) Field of Search ............................. 123/674; 701/109

(56) References Cited

U.S. PATENT DOCUMENTS

| | | |
|---|---|---|
| 4,796,589 | 1/1989 | Fujimoto et al. . |
| 4,864,998 | 9/1989 | Onishi . |
| 4,905,653 | 3/1990 | Manaka et al. . |
| 5,053,968 | 10/1991 | Uchinami . |
| 5,213,088 | 5/1993 | Harada . |
| 5,218,946 | 6/1993 | Wild . |
| 5,345,921 | 9/1994 | Iwano et al. . |
| 5,477,842 | 12/1995 | Maruyama et al. . |
| 5,505,184 | 4/1996 | Uchikawa . |
| 5,544,638 * | 8/1996 | Yuda ........................... 123/674 |
| 5,546,918 | 8/1996 | Mayer et al. . |
| 5,577,486 * | 11/1996 | Harism et al. ................. 123/674 |
| 5,694,911 | 12/1997 | Kawamoto et al. . |
| 5,701,871 | 12/1997 | Munakata et al. . |
| 5,706,654 * | 1/1998 | Nagai ........................... 123/674 |
| 5,765,541 * | 6/1998 | Farmer et al. ................. 123/674 |
| 5,778,859 * | 7/1998 | Takagi ........................... 123/674 |
| 5,797,384 * | 8/1998 | Kitagawa et al. ............... 123/674 |
| 6,026,794 * | 2/2000 | Kadowaki et al. ............. 123/674 |
| 6,161,530 * | 12/2000 | Kakizaki et al. ............... 123/674 |

FOREIGN PATENT DOCUMENTS

| | | |
|---|---|---|
| 59-90739 | 5/1984 | (JP) . |
| U-63-152 | 1/1988 | (JP) . |
| 64-66440 | 3/1989 | (JP) . |
| 2-37148 | 2/1990 | (JP) . |
| 2-95746 | 4/1990 | (JP) . |
| 4-318250 | 11/1992 | (JP) . |
| 6-272604 | 9/1994 | (JP) . |
| 7-26579 | 3/1995 | (JP) . |
| 8-232706 | 9/1996 | (JP) . |

* cited by examiner

Primary Examiner—John Kwon
(74) Attorney, Agent, or Firm—Nixon & Vanderhye P.C.

(57) ABSTRACT

An air/fuel ratio controller/method learns the deviation from a target air/fuel ratio and stores that learned value in a backup memory except when engine compartment temperature is ecessive.

10 Claims, 14 Drawing Sheets

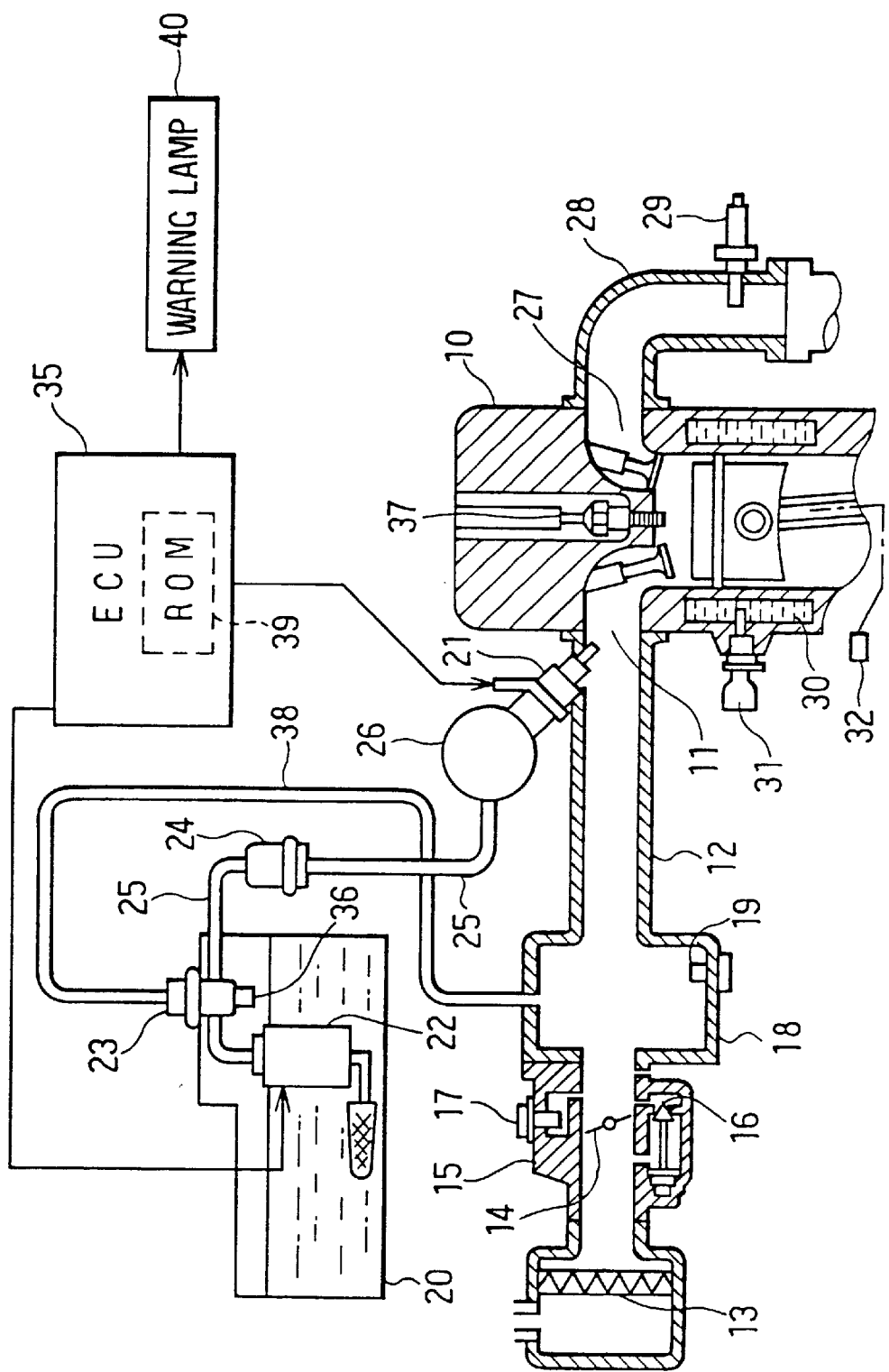
FIG. 1

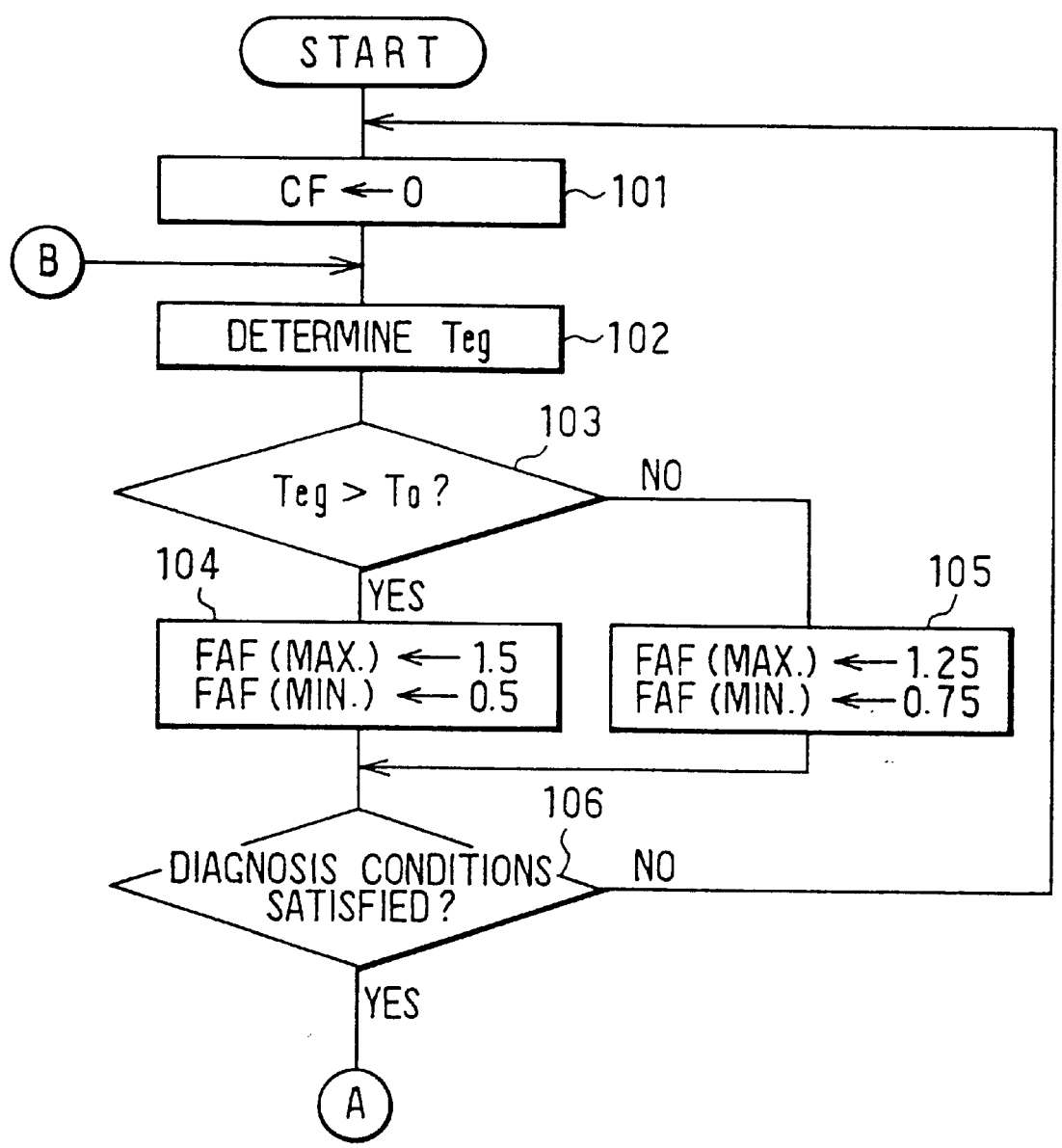

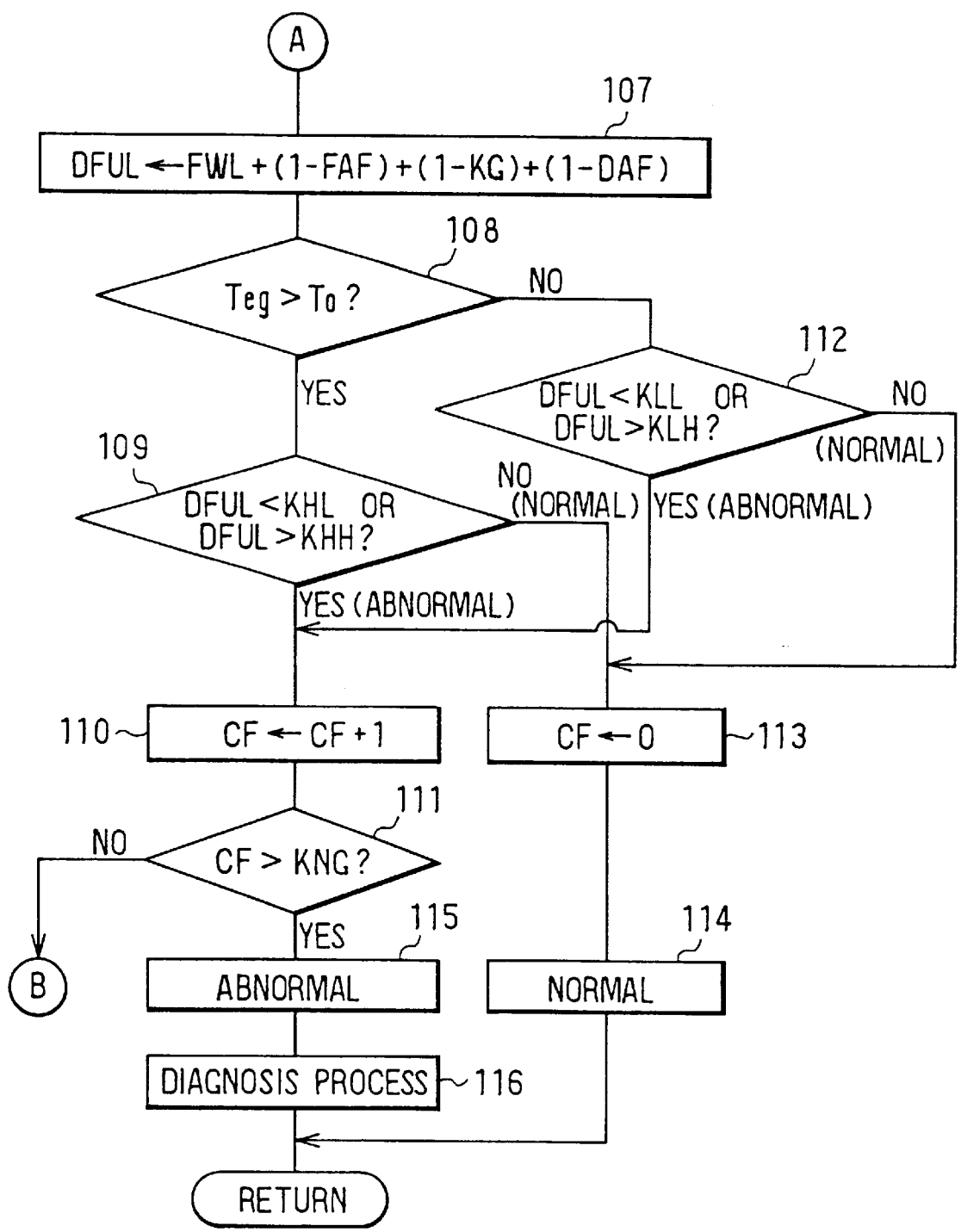
FIG. 3

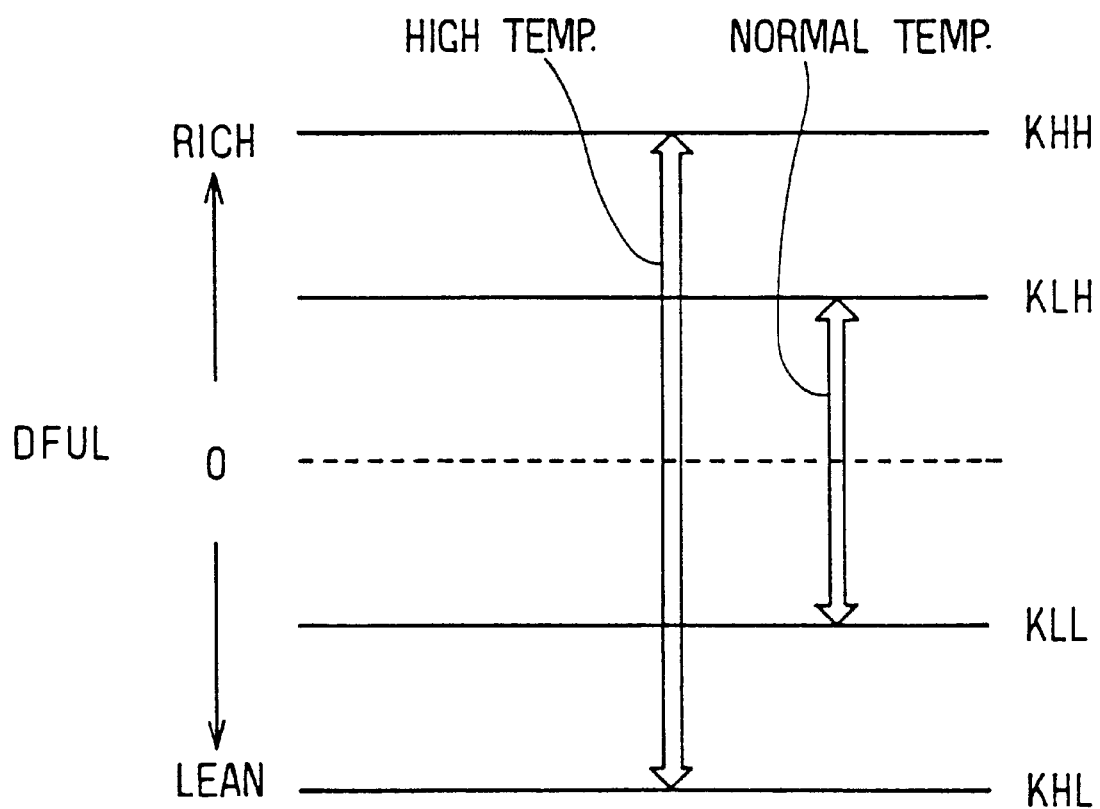
FIG. 4

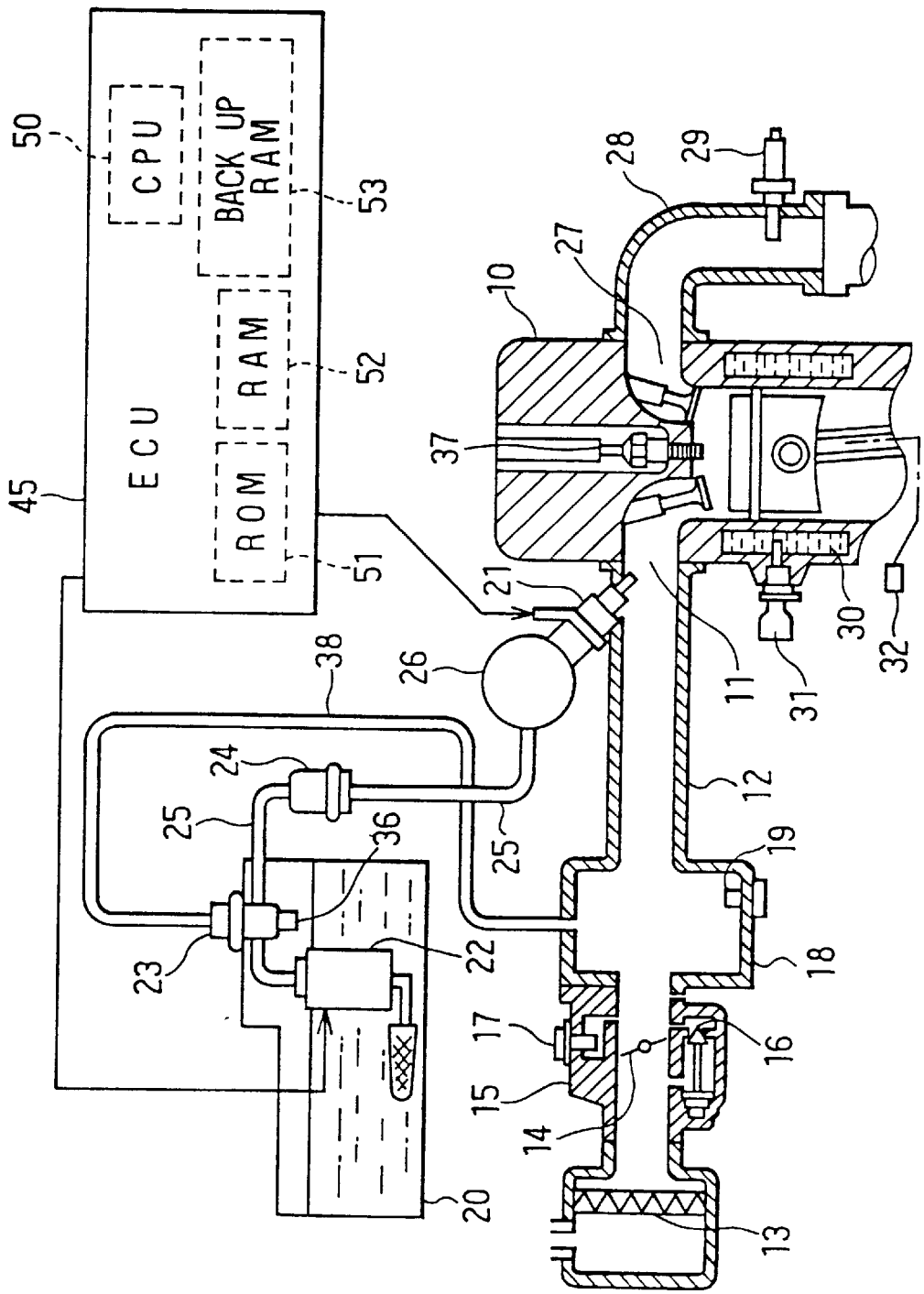
FIG. 5

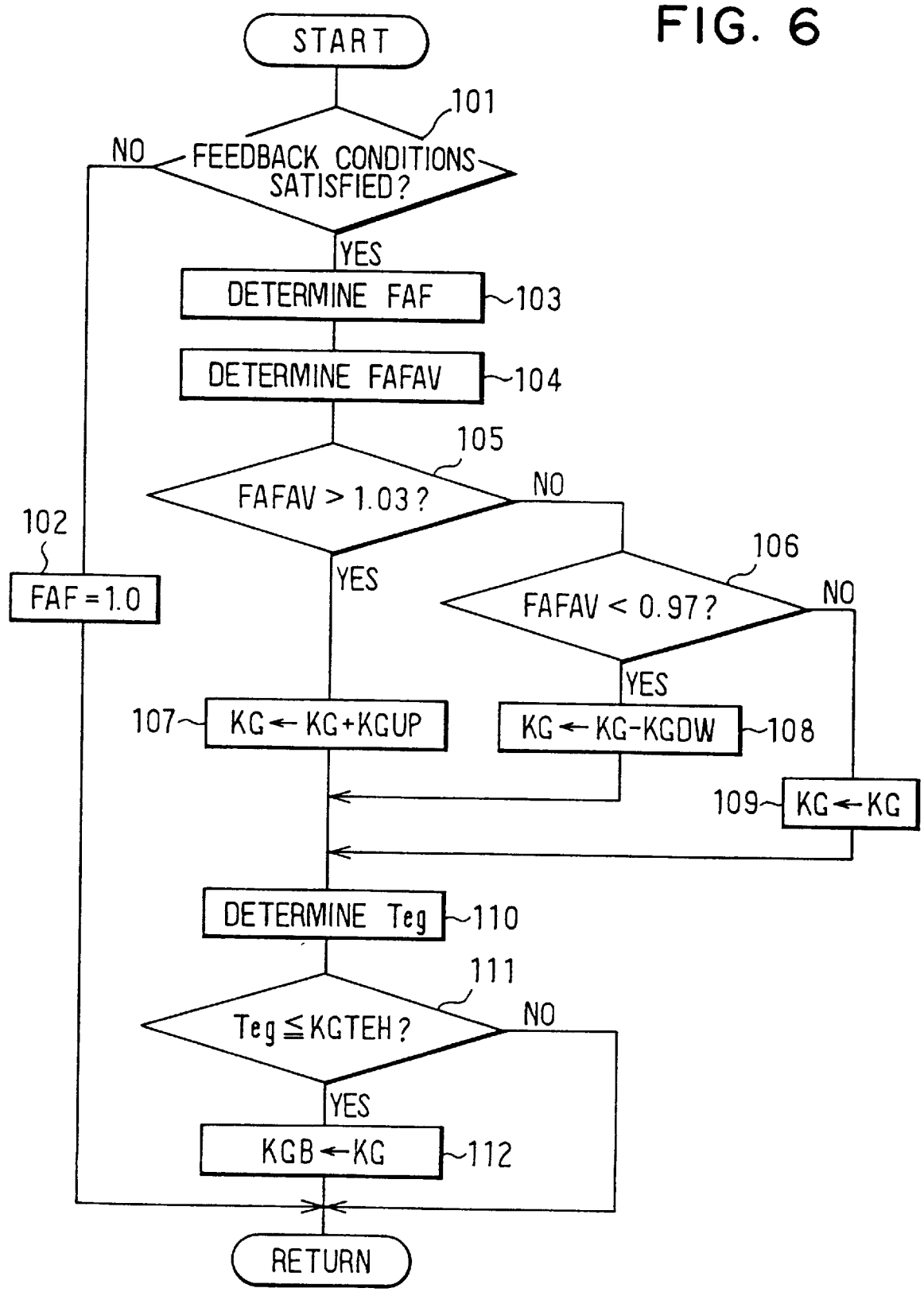
FIG. 6

FIG. 7A
Teg — KGTEH
FIG. 7B
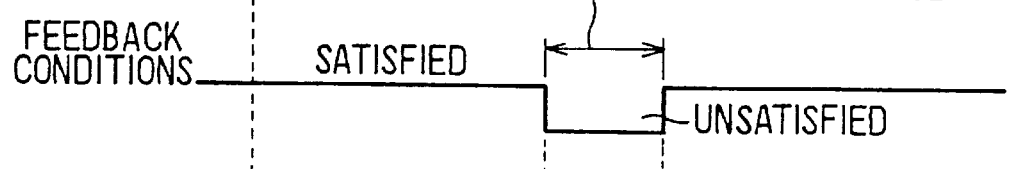
FEEDBACK CONDITIONS — SATISFIED — STOP FEEDBACK CONTROL — UNSATISFIED
FIG. 7C
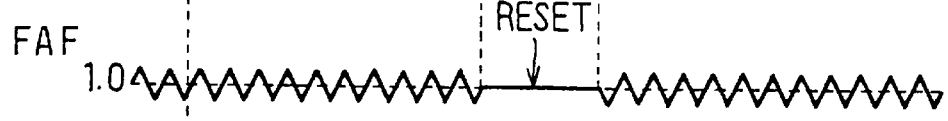
FAF 1.0 — RESET
FIG. 7D
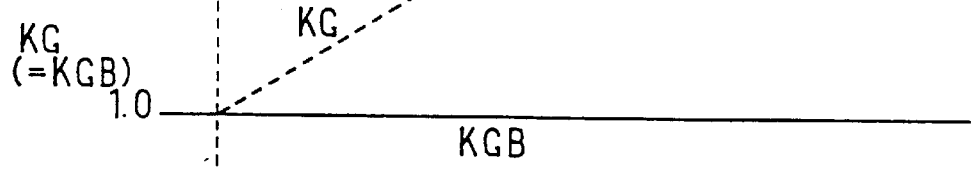
KG (=KGB) 1.0 — KG — KGB
FIG. 7E
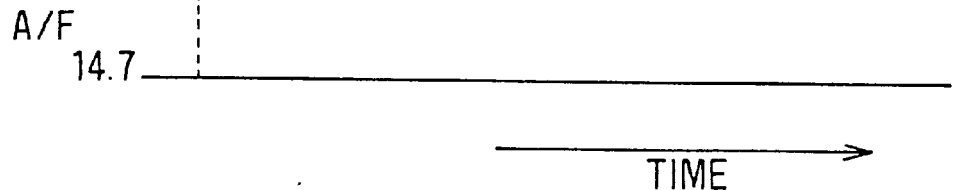
A/F 14.7
TIME →

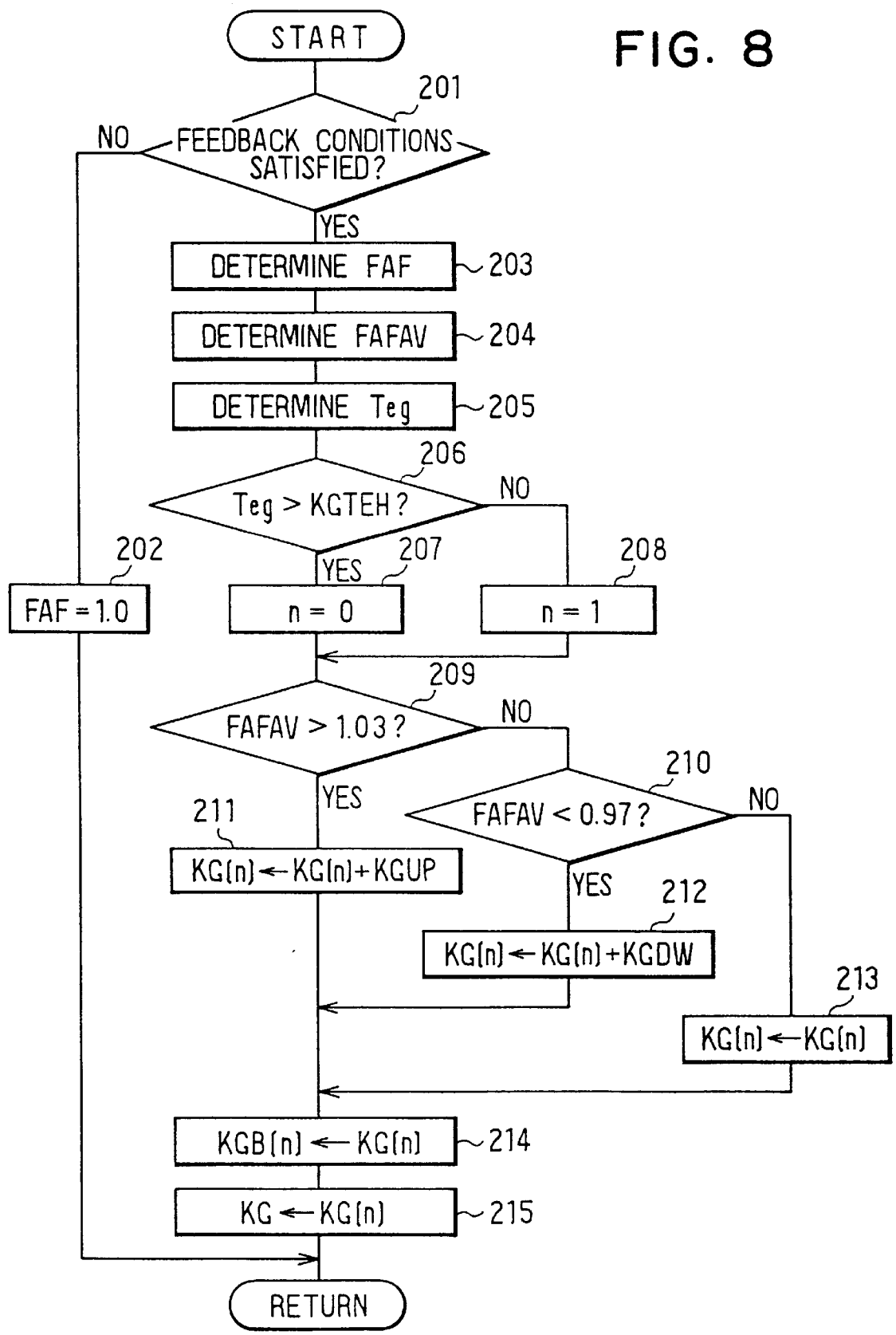
FIG. 8

FIG. 9A
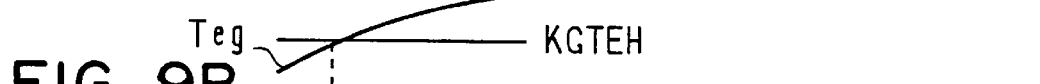
FIG. 9B
TEMPERATURE REGION [n]
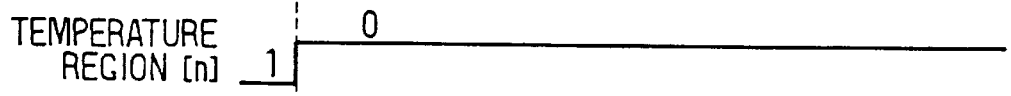
FIG. 9C
FEEDBACK CONDITIONS
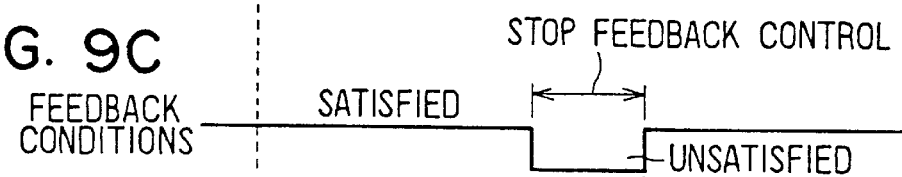
FIG. 9D
FAF
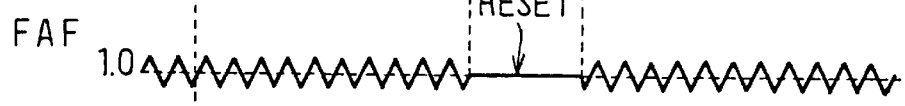
FIG. 9E
KG (=KGB)
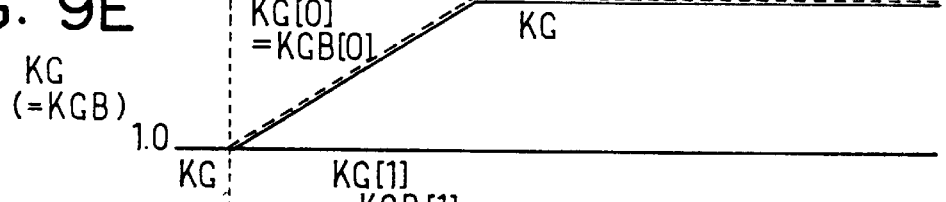
FIG. 9F
A/F
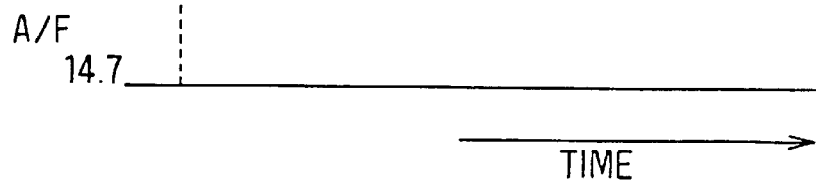
TIME FIG. 10
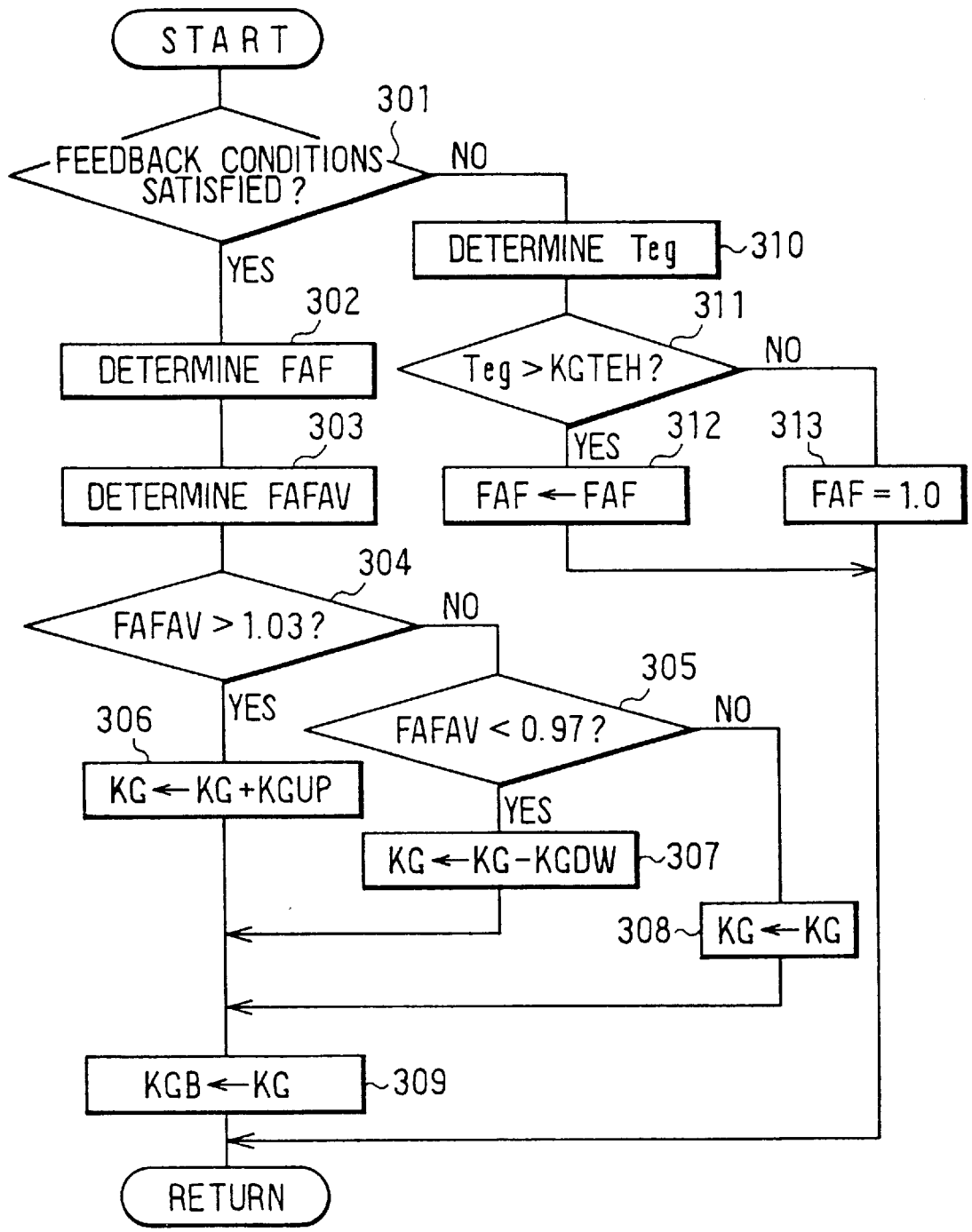

FIG. IIA

Teg — KGTEH

FIG. IIB

FEEDBACK CONDITIONS — SATISFIED — STOP FEEDBACK CONTROL — UNSATISFIED

NO RESET

FIG. IIC

FAF 1.0

FIG. IID

A/F 14.7

TIME

FIG. 12
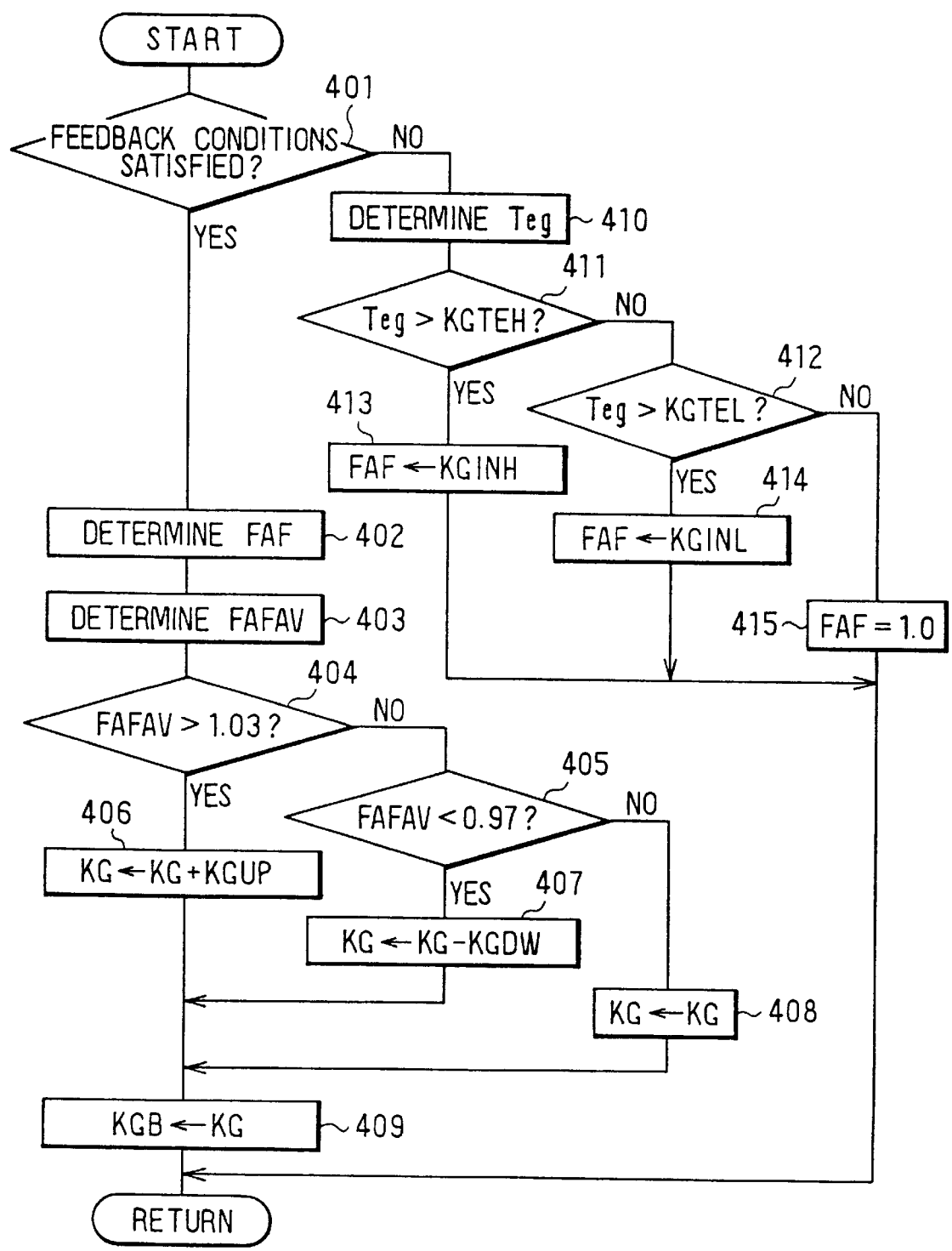

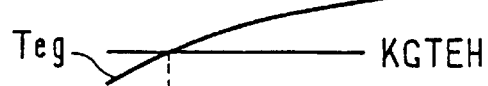
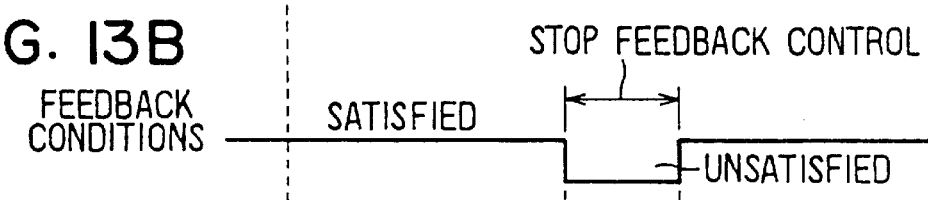

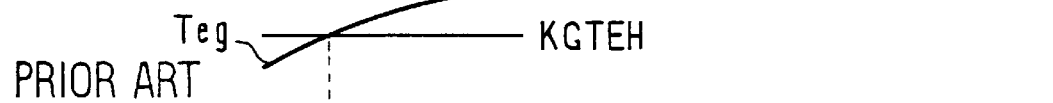
PRIOR ART
FIG. 14A
PRIOR ART
FIG. 14B
PRIOR ART
FIG. 14C
PRIOR ART
FIG. 14D
PRIOR ART
FIG. 14E

CONTROL APPARATUS FOR INTERNAL COMBUSTION ENGINE

CROSS REFERENCE TO RELATED APPLICATIONS

This application is based upon and claims priority from Japanese Patent Application Nos. Hei 9-246967 filed Sep. 11, 1997, and Hei 9-272430 filed Oct. 6, 1997, the entire contents of which are incorporated herein by reference.

BACKGROUND OF THE INVENTION

1. Field of the Invention

The present invention relates to a control apparatus for an internal combustion engine, for diagnosing an abnormality of a fuel supply system from a air/fuel ratio feedback correction or the like, or for improving the air/fuel ratio control under high temperature in the engine compartment.

2. Description of Related Art

Regarding a control apparatus for an internal combustion engine, when a fuel supply system component, such as a fuel injection valve or a fuel pump, is troubled or deteriorated, the basic air/fuel ratio (i.e., a basic fuel injection amount) highly deviates from a target value, and the air/fuel ratio feedback correction amount becomes excessively high. In this respect, Japanese Patent Application Laid-Open No. 4-318250 discloses a fuel control apparatus, in which the abnormality of the fuel supply system is diagnosed by comparing the air/fuel ratio feedback correction amount with a predetermined abnormality determination value. Considering that the fluctuation of the basic air/fuel ratio (and the fluctuation of the air/fuel ratio feedback correction amount) becomes vigorous during a transient drive, moreover, the disclosure prohibits the diagnosis of the abnormality of the fuel supply system at the transient drive so as to prevent the diagnosis failure caused by the fluctuation of the air/fuel ratio during the transient drive.

However, driving condition with a possibility that the basic air/fuel ratio highly deviates while the fuel supply system is normally working, corresponds not only to the transient drive but also to the situation in which the temperature in the engine compartment is high. The reasons for this may be as follows:

(1) When the engine compartment temperature is high, the fuel temperature in the fuel pipe of the engine compartment also becomes hot to produce vapor (or bubble) in the fuel. As a result, the fuel to be injected from the fuel injection valve contains the vapor so that the fuel injection amount is decreased and the air/fuel ratio is shifted to a leaner side. Especially in a system having a returnless pipe system (the system in which the return pipe, for returning to the fuel tank an excessive fuel in a delivery pipe for distributing the fuel to the fuel injection valves of the individual cylinders, is omitted), the fuel in the fuel pipe of the engine compartment has no circulation. Therefore, the fuel temperature in the fuel pipe is liable to rise in the fuel pipe, and is liable to enlarge the deviation of the fuel injection amount due to the fuel vapor;

(2) When the temperature in the engine compartment is high, the sensors (e.g., an air flow sensor, an intake pipe pressure sensor or an intake air temperature sensor) of the air/fuel ratio control system and the fuel injection valves turn hot, so that the characteristics of these parts are chaged.

(3) When the temperature in the engine compartment is high, the intake air temperature rises in the course of the intake air flowing through the intake air pipe to the engine, so that the difference between the intake air temperature measured by the intake air temperature sensor and the actual engine intake air temperature becomes large to cause a deviation in the intake air temperature correction coefficient of the air/fuel ratio.

Since those causes (1) to (3) may enlarge the deviation from the basic air/fuel ratio when the engine compartment temperature is high, it is conceivable to prevent the diagnosis failure by prohibiting the abnormality diagnosis for the fuel supply system at the high temperature in the engine compartment as well as the transient drive.

However, since the high temperature in the engine compartment often continues longer than the transient drive, the prohibition of the abnormality diagnosis while the engine compartment temperature is high may elongate the diagnosis prohibition period too much. This raises a problem that the discovery of an abnormality may be delayed.

Furthermore, if the internal combustion engine is run under a high load for a long time, the temperature of the engine may still be hot even after it is stopped, and vapor (or evaporated fuel gas) may be liable to be generated in the fuel pipe. When the engine is restarted under the situation that the engine is still hot (referred to as the "hot restarting"), the fuel injection rate is made lower than the demanded value by the vapor, so that the air/fuel ratio shifts to a lean side. This lowers the accuracy of the learned value of the air/fuel ratio, so that a proper air/fuel ratio feedback control cannot be achieved. For this solution, the air/fuel ratio learning is prohibited during the hot restarting in an Examined Published Japanese Patent Application No. 7-26579(JP-B2-7-26579).

During the prohibition of the air/fuel ratio learning, the deviation of the air/fuel ratio due to the vapor has to be absorbed exclusively by the feedback correction coefficient. As illustrated in FIGS. 14A to 14E, therefore, there is a tendency that the feedback correction coefficient during the air/fuel ratio learning prohibition becomes large. When the air/fuel ratio feedback control is then stopped by cutting the fuel or the like, the feedback correction coefficient is reset to an initial value (1.0). When the temporarily stopped air/fuel ratio feedback control is restarted, therefore, the feedback correction is made to allow the feedback correction coefficient to restore the initial value (1.0) to a proper value. However, since the difference between the initial value and the proper value of the feedback correction coefficient is large during the air/fuel ratio learning prohibition, it takes a long time to restore the feedback correction coefficient to the proper value by the air/fuel ratio feedback control. Thus, there arises a problem that the deviation P arises in the air/fuel ratio for the long time period thereby to affect the exhaust emission or the like adversely.

SUMMARY OF THE INVENTION

The invention is made in light of the foregoing problems, and it is an object of the present invention to provide a control apparatus for an internal combustion engine which can diagnose an abnormality in a fuel supply system while preventing the diagnosis failure even when the temperature in the engine compartment is high, and can make an early discovery of the abnormality and a prevention of the diagnosis failure compatible.

A further object of the invention is to provide a control apparatus for an internal combustion engine which can improve the air/fuel ratio control accuracy at high temperature atmosphere, which is liable to generate a vapor in the fuel pipe, such as the hot restarting.

According to a control apparatus for an internal combustion engine of the present invention, when whether or not a fuel supply system is abnormal is to be diagnosed by diagnosis means by comparing an air/fuel ratio deviation index value including at least an air/fuel ratio feedback correction with an abnormality determination value, the temperature in an engine compartment is decided by temperature determining means so that the abnormality determination value is set by abnormality determination value setting means in accordance with the engine compartment temperature. As a result, the abnormality of the fuel supply system (i.e., the abnormal deviation of the air/fuel ratio) can be diagnosed while preventing a diagnosis failure, even when the engine compartment temperature is high and the deviation of the basic air/fuel ratio is large, so that the early discovery of the abnormality and the prevention of the diagnosis failure can be made compatible.

Furthermore, a rich abnormality determination value and a lean abnormality determination value may be set as the abnormality determination value, and the rich abnormality determination value may be shifted to the richer side and/or the lean abnormality determination value may be shifted to the leaner side as the engine compartment temperature becomes the higher. Since the deviations of the base air/fuel ratio to the richer/leaner sides are given a tendency to grow the more for the higher engine compartment temperature by the fuel vapor generated in the fuel pipe and in dependence upon the temperature characteristics of the components, more specifically, the mistaken diagnosis at the hot time can be reliably prevented if the rich/lean abnormality determination values are shifted to the richer/leaner sides for the higher engine compartment temperature. In this case, only one of the rich abnormality determination value and the lean abnormality determination value may be shifted to the richer/leaner side.

In a system for updating and storing a learning correction for correcting the deviation of an actual air/fuel ratio from a target air/fuel ratio by learning the learning correction by learning means, moreover, whether or not the fuel supply system is abnormal may be diagnosed by using at least the difference between the actual air/fuel ratio and the target air/fuel ratio and the learning correction in addition to an air/fuel ratio feedback correction. Thus, the abnormality of the fuel supply system can be quickly detected from at least the above-specified three air/fuel ratio index values even when the engine compartment temperature is high, so that the reliability of the abnormality diagnosis can be improved.

According to another aspect of the present invention, the temperature in the engine compartment is decided by temperature determining means. If the engine compartment temperature is at an ordinary level (i.e., a temperature at which little vapor is generated in the fuel pipe), the deviation of the actual air/fuel ratio from the target air/fuel ratio is learned by the learning means so that the learned value is backed up by backup memory means. When the engine compartment temperature is high, on the contrary, it is prohibited to back up the learned value of the air/fuel ratio deviation, as learned by the learning means, in the backup memory means.

Moreover, the air/fuel ratio deviation may be learned for every temperature regions in the engine compartment, and the learned value to be used for calculating the fuel injection rate may be switched according to the engine compartment temperature. Then, even when the engine compartment temperature is high and the vapor is liable to appear in the fuel pipe as at a hot restarting, the air/fuel ratio control when the engine compartment temperature is high can be more accurately than the prior art by using the learned value which has been learned for the temperature region. In this case, the learned value, as learned in an ordinary temperature region, is used when the engine compartment temperature is ordinary, so that the reduction in the learning accuracy, as might otherwise be caused by the learned value when the engine compartment temperature is high, is prevented.

When the engine compartment temperature is high, the feedback correction coefficient, as stored in memory means, need not be reset even when the air/fuel ratio feedback control is stopped by cutting the fuel. When the temporarily stopped air/fuel ratio feedback control is to be restarted, the air/fuel ratio feedback control is restarted by using the feedback correction coefficient just before its stop as an initial value. As a result, the deviation between the initial value and the proper value of the feedback correction coefficient when the air/fuel ratio feedback control is restarted can be reduced to make far shorter the time period for the feedback correction coefficient to restore the proper value after the air/fuel ratio feedback control is restarted, thereby to reduce the deviation of the air/fuel ratio after the air/fuel ratio feedback control is restarted.

Furthermore, the initial value of the feedback correction coefficient at the time when the air/fuel ratio feedback control is restarted from the stop state of the air/fuel ratio feedback control may be set according to the temperature in the engine compartment. Then, the deviation between the initial value and the proper value of the feedback correction coefficient at the time of restarting the air/fuel ratio feedback control can also be reduced to reduce the deviation of the air/fuel ratio after the air/fuel ratio feedback control is restarted.

Furthermore, in a system of a returnless piping construction in which a return pipe, for returning the excessive fuel to a fuel tank in a delivery pipe for distributing the fuel to the fuel injection valves of individual cylinders, is omitted, the fuel in the fuel pipe of the engine compartment has no circulation. Therefore, the fuel temperature in the fuel pipe is liable to rise in the fuel pipe, and is liable to enlarge the deviation of the fuel injection amount due to the fuel vapor. If the invention is applied to the system of the returnless piping construction, the air/fuel ratio control having little deviation of the air/fuel ratio can be achieved even when the engine compartment temperature is high and the air/fuel ratio is liable to deviate as shown in the related art.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 1 is a schematic illustration showing the entire construction of a system according to a first embodiment of the present invention;

FIG. 2 is a flow chart showing a first half processing flow of an abnormality diagnosis program for a fuel supply system according to the first embodiment of the present invention;

FIG. 3 is a flowchart showing a second half processing flow of the abnormality diagnosis program for the fuel supply system according to the first embodiment of the present invention;

FIG. 4 is a diagram illustrating relations between lean/rich abnormality determination values KHL and KHH under high temperature and lean/rich abnormality determination values KLL and KLH under normal temperature;

FIG. 5 is a schematic illustration showing the entire construction of a system according to a second embodiment of the present invention;

FIG. 6 is a flow chart showing a processing flow of an air/fuel ratio control program according to the second embodiment of the present invention;

FIG. 7A is a timing chart showing an engine compartment temperature Teg in an air/fuel ratio control at a hot restarting according to the second embodiment of the present invention;

FIG. 7B is a timing chart showing a satisfied/unsatisfied feedback conditions in the air/fuel ratio control at the hot restarting according to the second embodiment of the present invention;

FIG. 7C is a timing chart showing a feedback correction coefficient FAF in the air/fuel ratio control at the hot restarting according to the second embodiment of the present invention;

FIG. 7D is a timing chart showing a learned value KG and a backup learned value KGB in the air/fuel ratio control at the hot restarting according to the second embodiment of the present invention;

FIG. 7E is a timing chart showing an air/fuel ratio A/F in the air/fuel ratio control at the hot restarting according to the second embodiment of the present invention;

FIG. 8 is a flow chart showing a processing flow of an air/fuel ratio control program according to a third embodiment of the present invention;

FIG. 9A is a timing chart showing an engine compartment temperature Teg in an air/fuel ratio control under high temperature of an engine compartment according to the third embodiment of the present invention;

FIG. 9B is a timing chart showing a temperature region [n] in the air/fuel ratio control under high temperature of the engine compartment according to the third embodiment of the present invention;

FIG. 9C is a timing chart showing a satisfied/unsatisfied feedback conditions in the air/fuel ratio control under high temperature of the engine compartment according to the third embodiment of the present invention;

FIG. 9D is a timing chart showing a feedback correction coefficient FAF in the air/fuel ratio control under high temperature of the engine compartment according to the third embodiment of the present invention;

FIG. 9E is a timing chart showing a learned value KG and backup learned value KGB in the air/fuel ratio control under high temperature of the engine compartment according to the third embodiment of the present invention;

FIG. 9F is a timing chart showing an air/fuel ration A/F in the air/fuel ratio control under high temperature of the engine compartment according to the third embodiment of the present invention;

FIG. 10 is a flow chart showing a processing flow of an air/fuel ratio control program according to a fourth embodiment of the present invention;

FIG. 11A is a timing chart showing an engine compartment temperature Teg in an air/fuel ratio control under high temperature of an engine compartment according to the fourth embodiment of the present invention;

FIG. 11B is a timing chart showing a satisfied/unsatisfied feedback conditions in the air/fuel ratio control under high temperature of the engine compartment according to the fourth embodiment of the present invention;

FIG. 11C is a timing chart showing a feedback correction coefficient FAF in the air/fuel ratio control under high temperature of the engine compartment according to the fourth embodiment of the present invention;

FIG. 11D is a timing chart showing an air/fuel ration A/F in the air/fuel ratio control under high temperature of the engine compartment according to the fourth embodiment of the present invention;

FIG. 12 is a flow chart showing a processing flow of an air/fuel ratio control program according to a fifth embodiment of the present invention;

FIG. 13A is a timing chart showing an engine compartment temperature Teg in an air/fuel ratio control under high temperature of an engine compartment according to the fifth embodiment of the present invention;

FIG. 13B is a timing chart showing a satisfied/unsatisfied feedback conditions in the air/fuel ratio control under high temperature of the engine compartment according to the fifth embodiment of the present invention;

FIG. 13C is a timing chart showing a feedback correction coefficient FAF in the air/fuel ratio control under high temperature of the engine compartment according to the fifth embodiment of the present invention;

FIG. 13D is a timing chart showing an air/fuel ration A/F in the air/fuel ratio control under high temperature of the engine compartment according to the fifth embodiment of the present invention;

FIG. 14A is a timing chart showing an engine compartment temperature Teg in an air/fuel ratio control at a hot restarting according to related art;

FIG. 14B is a timing chart showing a satisfied/unsatisfied feedback conditions in the air/fuel ratio control at the hot restarting according to the related art;

FIG. 14C is a timing chart showing a feedback correction coefficient FAF in the air/fuel ratio control at the hot restarting according to the related art;

FIG. 14D is a timing chart showing a learned value KG and a backup learned value KGB in the air/fuel ratio control at the hot restarting according to the related art; and FIG. 14E is a timing chart showing an air/fuel ratio A/F in the air/fuel ratio control at the hot restarting according to the related art.

DESCRIPTION OF THE PREFERRED EMBODIMENTS

Embodiments of the present invention will be described with reference to the accompanying drawings.

(First Embodiment)

First of all, a schematic construction of the entire system will be described with reference to FIG. 1. At the most upstream of an intake pipe 12 connected to an intake port 11 of an internal combustion engine 10, there is disposed an air cleaner 13, downstream of which there is disposed a throttle valve 14. This throttle valve 14 is accommodated in a throttle body 15, which is equipped with an idle speed control valve 16 for adjusting the flow of intake air to bypass the throttle valve 14, and an intake pipe pressure sensor 17 for detecting an intake pipe pressure. Downstream of this throttle body 15, there is disposed a surge tank 18, in which an intake air temperature sensor 19 is disposed for detecting an intake air temperature.

In the vicinity of the intake port 11 of each cylinder, on the other hand, there is disposed a fuel injection valve 21 for injecting a fuel (e.g., gasoline) to be fed to a fuel tank 20. The fuel in the fuel tank 20 is sucked up by a fuel pump 22 and fed via a fuel pipe 25 through a pressure regulator 23 and a fuel filter 24 to a delivery pipe 26, from which it is distributed to the fuel injection valves 21 of the individual cylinders. The back pressure chamber of the pressure regulator 23 is let via a pressure introduction pipe 38 into the surge tank 18 to introduce the intake pipe pressure into the back pressure chamber of the pressure regulator 23 so that the fuel pressure in the fuel pipe 25 is adjusted to make constant its difference from the intake pipe pressure. The surplus of the fuel to be fed from the fuel pump 22 to the pressure regulator 23 is returned from a fuel return port 36 of the pressure regulator 23 into the fuel tank 20.

The fuel feed system thus far described is a return-less piping construction, from which there is eliminated the return piping for returning the surplus fuel from the delivery pipe 26 into the fuel tank 20 and in which the fuel pipe 25 terminates at the delivery pipe 26.

On the other hand, an exhaust pipe 28 is connected to an exhaust port 27 of the engine 10 and is equipped with an air/fuel ratio sensor 29 for detecting the air/fuel ratio of the exhaust gas, downstream of which there is disposed a (not-shown) ternary catalyst for cleaning the exhaust gas. Downstream of the ternary catalyst, moreover, there is disposed a (not-shown) oxygen sensor for detecting an oxygen concentration in the exhaust gas. To a water jacket 30 for cooling the engine 10, there is attached a water temperature sensor 31 for detecting the cooling water temperature. On the other hand, the number of revolutions (RPM) of the engine 10 is detected in terms of the interval of pulse signals which are outputted at every predetermined crank angles from a crank angle sensor 32.

The output signals of those various sensors are inputted to an engine control circuit (as will be shortly referred to as "ECU") 35. This ECU 35 reads therein the signals of the intake air temperature, the intake pipe pressure, the cooling water temperature, the engine RPM and the air/fuel ratio, as detected by the aforementioned various sensors, to control the fuel injection rate and the injection timing of the fuel injection valve 21, the ignition timing of an ignition plug 37 and so on, and feeds back and controls the actual air/fuel ratio to a target value on the basis of the air/fuel ratio, as detected by the air/fuel ratio sensor 29. During this air/fuel ratio feedback control, the ECU 35 calculates an air/fuel ratio feedback correction coefficient FAF for correcting the deviation of the actual air/fuel ratio from the target value, and learns the air/fuel ratio feedback correction coefficient to update and store a learning correction coefficient KG. This function corresponds to the learning means.

On the other hand, the ECU 35 executes a fuel supply system abnormality diagnosis program of FIGS. 2 and 3, as stored in a ROM 39 (or recording medium), at every predetermined time intervals to function as diagnosis means for diagnosing whether or not the fuel supply system is abnormal, and lights (or flash) a warning lamp 40 to warn the driver when it diagnoses that the fuel supply system is abnormal.

Here will be described the processing content of the fuel supply system abnormality diagnosis program of FIGS. 2 and 3. When this program is started, an abnormality timer CF is cleared at first Step 10 to an initial value (0). At subsequent Step 102, an engine compartment temperature Teg is decided. The decision of this engine compartment temperature Teg is made either by estimating it from the cooling water temperature or the intake air temperature, as detected by the water temperature sensor 31 or the intake air temperature sensor 19, or by disposing a (not-shown) temperature sensor in the engine compartment to detect the engine compartment temperature Teg directly by the temperature sensor. When the temperature Teg in the engine compartment is to be estimated from the cooling water temperature or the intake air temperature, moreover, there is set in advance a map or functional equation of the engine compartment temperature Teg for a parameter of the cooling water temperature or the intake air temperature, so that the engine compartment temperature Teg according to the cooling water temperature or the intake air temperature at that time may be calculated from the map or the functional equation. The operation of Step 102 functions as the temperature determining means.

At next Step 103, the engine compartment temperature Teg is compared with a preset decision temperature To (e.g., a temperature set within a range of 80 to 90° C.). When the engine compartment temperature Teg is higher than the decision temperature To, it is decided that the deviation of the base air/fuel ratio by the engine compartment temperature Teg is large, and the routine advances to Step 104, at which the maximum (or upper limit guard value) of the air/fuel ratio feedback correction coefficient FAF is set to 1.5 whereas the minimum (or lower limit guard value) of the FAF is set to 0.5.

When the engine compartment temperature Teg is equal to or lower than the decision temperature To, on the other hand, it is decided that the deviation of the base air/fuel ratio by the engine compartment temperature Teg is small, and the routine advances to Step 105, at which the maximum of the air/fuel ratio feedback correction coefficient FAF is set to 1.25 whereas the minimum of the FAF is set to 0.75.

The maximum and minimum of the air/fuel ratio feedback correction coefficient FAF are thus set according to the engine compartment temperature Teg, and the routine advances to Step 106, at which it is decided whether or not the following fuel supply system abnormality diagnosis executing conditions (a) to (d) hold:

(a) the running range is within a predetermined range (e.g., the engine RPM is within a predetermined range, and the intake pipe pressure is within a predetermined range);

(b) the air/fuel ratio feedback is being executed;

(c) the running state is not overrun; and (d) the cooling water temperature is at a predetermined or higher value.

The fuel supply system abnormality diagnosis executing conditions are satisfied, if all of those conditions (a) to (d) hold, but not if any of them fails to hold.

If the fuel supply system abnormality diagnosis conditions are not satisfied, the routine returns to Step 101 to repeat the foregoing operations without executing the fuel supply system abnormality diagnoses at and after Step 107 of FIG. 3.

If the fuel supply system abnormality diagnosis conditions are satisfied, on the contrary, the fuel supply system abnormality diagnoses at and after Step 107 of FIG. 3 are executed. First of all, an air/fuel ratio deviation index value DFUL is calculated at Step 107 from the following Formula:

$$DFUL = FWL + (1-FAF) + (1-KG) + (1-DAF),$$

FWL: Water Temperature Rise Correction Value;
FAF: Air/Fuel Ratio Feedback Correction Factor;
KG: Learning Correction coefficient; and
DAF: Excess Air Factor (=Actual Air/Fuel Ratio/Target Air/Fuel Ratio).

Here, the water temperature rise correction value FWL is at 0 after completion of the warming-up. On the righthand side of the Formula: (1−FAF) corresponds to the air/fuel ratio feedback correction value; (1−KG) corresponds to the learning correction coefficient; and (1−DAF) corresponds to the difference between the target air/fuel ratio and the actual air/fuel ratio.

At next Step 108, the engine compartment temperature Teg is compared with the present decision temperature To. When the engine compartment temperature Teg is higher than the decision temperature To (as will be merely called "at a high temperature"), the routine advances to Step 109, at which the air/fuel ratio deviation index value DFUL is compared with the hot lean abnormality determination value KHL and the hot rich abnormality determination value KHH, as illustrated in FIG. 4, to decide whether or not the air/fuel ratio deviation index value DFUL is in the abnormal range (i.e., DFUL<KHL or DFUL>KHH).

Considering the situation that the deviation of the base air/fuel ratio due to the engine compartment temperature Teg is large at the hot time, the hot lean abnormality determination value KHL is set at such a value as is shifted to a leaner side than a later-described ordinary lean abnormality determination value KLL, and the hot rich abnormality determination value KHH is set at such a value as is shifted to a richer side than a later-described ordinary rich abnormality determination value KLH. In short, at the hot time, the gap between the hot lean/rich abnormality determination values KHL and KHH (i.e., the normal range at the hot time) is set wider than the gap between the later-described ordinary lean/rich abnormality determination values KLL and KLH (i.e., the normal range at the ordinary time).

If it is decided at Step 109 that the air/fuel ratio deviation index value DFUL at the hot time is within the abnormal range at the hot time (DFUL<KHL or DFUL>KHH), the routine advances to Step 110, at which the abnormality timer CF is incremented. At next Step 111, it is decided whether or not the abnormality timer CF exceeds an abnormality determination time period KNG. More specifically, it is decided whether or not the continuation time period CF for which the air/fuel ratio deviation index value DFUL is within the abnormal range exceeds the abnormality determination time period KNG. If the abnormality determination time period KNG is exceeded, the routine advances to Step 115, at which it is decided that the fuel supply system is abnormal. At next Step 116, a diagnosis process is executed. In this diagnosis, the warning lamp 40 is lit (or flashed) to warn the driver, and the air/fuel ratio feedback is interrupted to prohibit the abnormality detection of the remaining parts. Here, the abnormality is not decided till the continuation time period CF for the abnormal range of the air/fuel ratio deviation index value DFUL exceeds the abnormality determination time period KNG, but the routine returns to Step 102 of FIG. 2 so that the aforementioned operations are repeated.

If it is decided at Step 109 that the hot air/fuel ratio deviation index value DFUL is within the normal range (KHL $\leq$ DFUL $\leq$ KHH), on the contrary, the routine advances to Step 113, at which the abnormality timer CF is cleared to the initial value (0). At Step 114, it is decided that the fuel supply system is normal, and the present program is ended.

When it is decided at Step 108 that the engine compartment temperature Teg is at or lower than the decision temperature To (as will be called the "ordinary time"), on the contrary, the routine advances to Step 112, at which the air/fuel ratio deviation index value DFUL is compared with the lean abnormality determination value KLL at the ordinary time and the rich abnormality determination value KLH at the ordinary time, as illustrated in FIG. 4, to decide whether or not the air/fuel ratio deviation index value DFUL is within the abnormal range (i.e., DFUL<KLL or DFUL>KLH). Considering that the deviation of the base air/fuel ratio by the engine compartment temperature Teg is small at the ordinary time, the gap between the lean/rich abnormality determination values KLL and KLH at the ordinary time (i.e., the normal range at the ordinary time) is set narrower than that between the lean/rich abnormality determination values KHL and KHH at the hot time (i.e., the normal range at the hot time). Here, the processes in Steps 108, 109 and 112 function as abnormality determination value setting means.

If the air/fuel ratio deviation index value DFUL at the normal time is within the abnormal range at the normal time (i.e., DFUL<KLL or DFUL>KLH) at Step 112, the routine advances to Step 110, at which the abnormality timer CF is incremented. At next Step 111, it is decided whether or not the abnormality timer CF exceeds the abnormality determination time period KNG. More specifically, it is decided whether or not the continuation time period CF for which the air/fuel ratio deviation index value DFUL is within the abnormal range exceeds the abnormality determination time period KNG. If the abnormality determination time period KNG is exceeded, the routine advances to Step 115, at which it is decided that the fuel supply system is abnormal. At next Step 116, the aforementioned diagnosis is executed. Here, the abnormality is not decided till the continuation time period CF for the abnormal range of the air/fuel ratio deviation index value DFUL exceeds the abnormality determination time period KNG, but the routine returns to Step 102 of FIG. 2 so that the aforementioned operations are repeated.

If it is decided at Step 112 that the ordinary air/fuel ratio deviation index value DFUL is within the normal range (KLL $\leq$ DFUL $\leq$ KLH), on the contrary, the routine advances to Step 113, at which the abnormality timer CF is cleared to the initial value (0). At Step 114, it is decided that the fuel supply system is normal, and the present program is ended.

Here in the system of the return-less piping constructing shown in FIG. 1, the fuel temperature in the fuel pipe 25 of the engine compartment is liable to rise because of absence of the fuel circulation in the fuel pipe 25. This invites a tendency that the deviation of the fuel injection rate (or the deviation of the base air/fuel ratio) due to the fuel vapor will grow large when the temperature in the engine compartment is high. In the aforementioned fuel supply system abnormality diagnosis system of the prior art, therefore, a diagnosis of the abnormality of the fuel supply system may be mistaken when it is made at a high temperature of the engine compartment.

In the embodiment thus far described, on the contrary, the lean/rich abnormality determination value is switched to the value which is shifted to the rich or leaner side when the temperature in the engine compartment is at the set or higher value. Even at a high temperature in the engine compartment, therefore, the abnormality (i.e., the abnormal deviation of the air/fuel ratio) of the fuel supply system can be diagnosed while preventing its mistaken diagnosis, so that the early discovery of abnormality and the prevention of the mistaken diagnosis can be made compatible.

In this case, the lean/rich abnormality determination values may be either switched at three or more stages in accordance with the temperature in the engine compartment or set continuously variable.

When the air/fuel ratio deviation index value DFUL is to be calculated, moreover, the embodiment thus far described adopted all of the air/fuel ratio feedback correction value (1−FAF), the learning correction coefficient (1−KG), the value (1−DAF) corresponding to the difference between the target air/fuel ratio and the actual air/fuel ratio, and the water temperature rise correction value FWL. It is, however, sufficient to employ at least the air/fuel ratio feedback correction value (1−FAF) while omitting the remaining parameters partially or wholly. Alternatively, the air/fuel ratio deviation index value DFUL may be averaged and compared with the lean/rich abnormality determination value.

Here, the invention should not be limited to the fuel supply system of the return-less piping construction but can be applied to a fuel supply system in which the excess fuel is returned via a return pipe from the delivery pipe 26 to the fuel tank 20.

[Second Embodiment]

A second embodiment of the present invention will be described with reference to FIGS. 5 to 7. The schematic construction of the entire system is shown in FIG. 5. In this and the following embodiments, components which are substantially the same as those in previous embodiments are assigned the same reference numerals.

The output signals of the various sensors are inputted to an engine control circuit (hereinafter referred to as "ECU") 45. The ECU 45 is constructed mainly of a microcomputer and has a CPU 50, a ROM 51, a RAM 52 (memory means) and a backup RAM 53 (backup memory means) to be energized by a battery (not-shown) even when the engine is stopped. This ECU 45 reads therein the signals of the intake air temperature, the intake pipe pressure, the cooling water temperature, the engine RPM and the air/fuel ratio, as detected by the aforementioned various sensors, to detect the engine running state thereby to control the fuel injection rate and the injection timing of the fuel injection valve 21, the ignition timing of an ignition plug 37 and so on.

Moreover, this ECU 45 functions as the air/fuel ratio control means by executing interruptions of the air/fuel ratio control program in FIG. 6, as stored in the ROM 51, at every predetermined time intervals (e.g., every 4 milliseconds.).

When the air/fuel ratio control program of FIG. 6 is started, it is decided at first Step 101 whether or not the feedback execution conditions are satisfied. Here, these feedback execution conditions are exemplified by that the running region is within a predetermined range (neither at the start nor at a high load run or at a fuel-cut run), that the cooling water temperature is at a predetermined or higher level, and that the air/fuel ratio sensor 29 is active. The feedback execution conditions hold, if all these conditions are satisfied, but not if any condition is dissatisfied.

If the feedback execution conditions fail to hold, the routine advances to Step 102, at which the feedback correction coefficient FAF for correcting the deviation of the actual air/fuel ratio from the target air/fuel ratio is set to "1.0", and the present program is ended. In this case, this air/fuel ratio feedback control is stopped to execute no air/fuel ratio feedback correction.

If the feedback execution conditions are satisfied, on the other hand, the routine advances from Step 101 to Step 103, at which the feedback correction coefficient FAF is calculated on the basis of the target air/fuel ratio and the output (or the actual air/fuel ratio) of the air/fuel ratio sensor 29. After this, at Step 104, the average value (or averaged value) FAFAV of the feedback correction coefficient FAF is calculated. At subsequent Step 105, it is decided whether or not the feedback correction coefficient average value FAFAV is larger than 1.03. If FAFAV>1.03, the routine advances to Step 107, at which a predetermined value KGUP is added to the previous learned value KG to determine the present learned value KG.

If FAFAV≦1.03 at Step 105, on the contrary, the routine advances to Step 106, at which it is decided whether or not the feedback correction coefficient average value FAFAV is smaller than 0.97. If FAFAV<0.97, the routine advances to Step 108, at which a predetermined value KGDW is subtracted from the previous learned value KG to determine the present learned value KG. Here, if 0.97≦FAFAV≦1.03, the air/fuel ratio A/F is stable, and the routine advances to Step 109, at which the previous learned value KG is employed as it is as the present learned value KG.

Thus, the learned value KG, as updated at Steps 107 to 109, is stored in the RAM 52 of the ECU 45 so that it is used for calculating the fuel injection rate. The processes in these Steps 105 to 109 function as learning means.

After this updating of the learned value KG, the engine compartment temperature Teg is decided at Step 110. This engine compartment temperature Teg may be estimated from the cooling water temperature and the intake air temperature which are detected by the water temperature sensor 31 and the intake air temperature sensor 19, or may be directly detected with a (not-shown) temperature sensor by mounting the sensor in the engine compartment. In the system equipped with a fuel temperature sensor, the engine compartment temperature Teg may be estimated from the fuel temperature which is detected by the fuel temperature sensor. When the temperature Teg in the engine compartment is to be estimated from the cooling water temperature or the intake air temperature, moreover, there is prepared a map or functional equation of the engine compartment temperature Teg adopting the cooling water temperature or the intake air temperature as the parameter, so that the engine compartment temperature Teg according to the cooling water temperature or the intake air temperature at that time may be calculated from the map or the functional equation. This process in Step 110 functions as temperature determining means.

At next Step 111, the engine compartment temperature Teg is compared with a preset decision temperature KGTEH (e.g., a level set within 80 to 90° C.). When the engine compartment temperature Teg is lower than the decision temperature KGTEH, it is decided that the deviation of the air/fuel ratio by the fuel vapor is little so that the reliability of the learned value at this time is high. Then, the routine advances to Step 104, at which the learned value KG of this time is updated and stored as the learning backup value KGB in a backup RAM 43, and the present program is ended. This learning backup value KGB is employed as the initial value of the learned value KG at the engine start.

When it is decided at Step 111 that the engine compartment temperature Teg is higher than the determination value KGTEH, on the contrary, the deviation of the air/fuel ratio by the fuel vapor is high, and it is decided that the reliability of the present learned value KG is low. Then, the present program is ended without backing up the present learned value KG in the backup RAM 53. The processes in these Steps 111 and 112 function as learning control means.

The functions and effects of the second embodiment will be described in contrast to the prior art shown in FIGS. 14A to 14E. At the hot restarting, the learning of the air/fuel ratio is prohibited, and the learned value KG is fixed at "1.0". Accordingly, the learning backup value KGB is also fixed at "1.0". During the prohibition of the air/fuel ratio learning, the deviation of the air/fuel ratio by the vapor has to be absorbed exclusively by the feedback correction coefficient FAF so that this feedback correction coefficient FAF during the air/fuel ratio learning prohibition has a tendency to rise.

When the air/fuel ratio feedback control is then stopped by cutting the fuel or the like, the feedback correction coefficient FAF is reset to the initial value (1.0). When the once-stopped air/fuel ratio feedback control is to be restarted, therefore, the feedback correction coefficient FAF is gradually restored from the initial value (1.0) to a proper value. Because of a large difference between the initial value and the proper value of the feedback correction coefficient during the air/fuel ratio learning prohibition, however, it takes a long time to restore the feedback correction coefficient FAF to the proper value by the air/fuel ratio feedback control. For this long time, the deviation P in FIG. 14C in the air/fuel ratio A/F is caused to affect the exhaust emission adversely.

In this second embodiment, the air/fuel ratio learning per se is not prohibited even at the hot restarting. When the engine compartment temperature Teg exceeds the decision level KGTEH, only the backup of the learned value KG to the backup RAM 53 is prohibited so that the learning backup value KGB is not updated. As a result, the mistaken learning is prevented.

Furthermore, in this second embodiment, even when the engine compartment temperature is high and the vapor is liable to appear in the fuel pipe, such as at the hot restarting, the air/fuel ratio learning is continued to reflect its learned value KG on the air/fuel ratio control (or the calculation of the fuel injection rate). As compared with the prior art, therefore, the feedback correction coefficient FAF is reduced by the learned value KG to a value approximate to "1.0". As a result, even if the feedback feedback control is stopped by cutting the fuel so that the feedback correction coefficient FAF is reset to the initial value (1.0), the difference between the initial value and the proper value of the feedback correction coefficient FAF is far smaller than that of the prior art. This cuts remarkably shorter the time period for the feedback correction coefficient FAF to restore the proper value after the air/fuel ratio feedback control is restarted, than that in the prior art. As a result, the deviation of the air/fuel ratio A/F after the restarting of the air/fuel ratio feedback control can be reduced to reduce the exhaust emission.

[Third Embodiment]

A third embodiment of the invention will be described with reference to FIG. 8 and FIGS. 9A to 9F. In this third embodiment, the air/fuel ratio deviation is learned for every temperature regions in the engine compartment so that the learned value to be used for calculating the fuel injection rate is switched according to the temperature in the engine compartment.

In the air/fuel ratio control program in FIG. 8, the feedback correction coefficient FAF is set to "1.0" (at Steps 201 and 202). When the feedback execution conditions hold, the feedback correction coefficient FAF and the feedback correction coefficient average value FAFAV are calculated (at Steps 203 and 204). At subsequent Step 205, the engine compartment temperature Teg is decided by the same method as that of Step 110 of FIG. 6. At subsequent Step 206, the engine compartment temperature Teg is compared with the preset decision level KGTEH (e.g., the temperature set within a range of 80 to 90° C.) to decide a temperature region [n] to which the present engine compartment temperature Teg belongs. If Teg>TGTEH, the routine advances to Step 207, at which the hot region [0] is decided. If Teg≦KGTEH, the routine advances to Step 208, at which the ordinary temperature region [1] is decided.

At subsequent Step 209, it is decided whether or not the feedback correction coefficient average value FAFAV is larger than 1.03. If FAFAV>1.03, the routine advances to Step 211 at which a predetermined value KGUP is added to the learned value KG[n] of the present temperature region [n] to make an update to the learned value KG[n} of the present temperature region [n].

If FAFAV≦1.03 at Step 209, on the contrary, the routine advances to Step 210, at which it is decided whether or not the feedback correction coefficient average valve FAFAV is smaller than 0.97. If FAFAV<0.97, the routine advances to Step 212, at which the predetermined value KGDW is subtracted from the learned value KG[n] of the present temperature region [n] to update the learned value KG[n] of the present temperature region [n]. If 0.97≦FAFAV≦1.03, the routine advances to Step 213, at which the learned value KG[n] of the present temperature region [n] is kept as it is.

Thus, the learned value KG[n], as updated at Steps 209 to 213, is stored in the RAM 52 of the ECU 45 so that it is employed for calculating the fuel injection rate.

At subsequent Step 214, the learned value KG[n] of the present temperature region [n] is updated and stored as the learning backup value KGB[n] of the temperature region [n] in the backup RAM 53. After this, at Step 215, the learned value KG[n] of the present temperature region [n] is selected as the learned value KG to be used for calculating the fuel injection rate, and the present program is ended.

The functions and effects of the third embodiment thus far described will be described with reference to FIGS. 9A to 9F. FIGS. 9A to 9F illustrate behaviors of the air/fuel ratio control at a hot time of the engine compartment. When the engine compartment temperature Teg belongs to an ordinary temperature region [1], according to this third embodiment, the learned value KG[1] of the ordinary temperature region [1] is updated and is selected as the learned value KG to be used for calculating the fuel injection rate.

When the engine compartment temperature Teg then exceeds the decision temperature KGTEH, the leaving value KG[0] of a high-temperature region [0] is updated and is selected as the learned value KG to be used for calculating the fuel injection rate.

In this case, too, the feedback correction coefficient FAF is reset to the initial value (1.0) when the air/fuel ratio feedback control is stopped by cutting the fuel. Even in the hot region [0] where the vapor is liable to appear in the fuel pipe as at the hot restarting, the air/fuel ratio learning is continued to give the feedback correction coefficient FAF a value near "1.0". This cuts remarkably shorter the time period for the feedback correction coefficient FAF to restore the proper value after the air/fuel ratio feedback control is restarted, than that in the prior art. As a result, the deviation of the air/fuel ratio A/F after the restarting of the air/fuel ratio feedback control can be reduced.

When the engine compartment temperature Teg belongs to the ordinary temperature region [1], on the other hand, the learned value KG[1], as learned for the ordinary temperature region [1], is employed for calculating the fuel injection rate so that the reduction in the learning accuracy by the learned value KG[0] at the hot time of the engine compartment can be avoided.

In this third embodiment, the engine compartment temperature Teg is divided into the two temperature regions but may be divided into three or more temperature regions for the learning operation.

[Fourth Embodiment]

A fourth embodiment of the invention will be described with reference to FIG. 10 and FIGS. 11A to 11D. In this fourth embodiment, at a hot time of the engine compartment, the feedback correction coefficient FAF, as stored in the RAM 52 (or memory means) of the ECU 45, is not reset even when the air/fuel ratio feedback control is stopped.

When the air/fuel ratio control program of FIG. 10 is started, it is decided at first Step 301 by a method similar to that of Step 101 of FIG. 6 whether or not the feedback execution conditions hold. When these feedback execution conditions hold, the feedback correction coefficient FAF and the feedback correction coefficient average value FAFAV are calculated by methods similar to those of Steps 103 to 109 of FIG. 6, and the learned value KG is updated, so that these values are stored in the RAM 52 of ECU 45. Here, the processes in Steps 302 and 303 function as the calculation means. At subsequent Step 312, moreover, the learned value KG of this time is updated and stored as the learning backup value KGB in the backup RAM 53, and the present program is ended.

When it is decided at Step 301 that the feedback execution conditions fails to hold, on the contrary, the air/fuel ratio feedback control is stopped. In this case, the routine advances to Step 310, at which the engine compartment temperature Teg is decided by a method similar to that of Step 110 of FIG. 6. After this, at Step 311, the engine compartment temperature Teg is compared with the preset decision temperature KGTEH (e.g., a temperature set within a range of 80 to 90° C.). When the engine compartment temperature Teg is higher than the determination value KGTEH, the routine advances to Step 312. At this Step 312, the feedback correction coefficient FAF, as stored in the RAM 52, is not reset, but the feedback correction coefficient FAF just before the stop of the air/fuel ratio feedback control is kept as it is, even when the air/fuel ratio feedback control is stopped, and the present program is ended.

When it is decided at Step 311 that the engine compartment temperature Teg is at or lower than the decision level KGTEH (or the ordinary temperature region), on the contrary, the routine advances to Step 313, at which the feedback correction coefficient FAF is set to "1.0", and the present program is ended.

The functions and effects of the fourth embodiment thus far described will be described with reference to FIGS. 11A to 11D. FIGS. 11A to 11D illustrate the behaviors of the air/fuel ratio control at a high time of the engine compartment. Even when the air/fuel ratio feedback control is stopped by cutting the fuel, according to the fourth embodiment, the feedback correction coefficient FAF is not reset if the engine compartment temperature Teg is higher than the decision temperature KGTEH, but the feedback correction coefficient FAF just before the stop of the air/fuel ratio feedback control is kept as it is. After this, the air/fuel ratio feedback control is restarted, if intended, by employing the feedback correction coefficient FAF just before the stop of the air/fuel ratio feedback control as the initial value. As a result, the deviation between the initial value and the proper value of the feedback correction coefficient FAF at the restarting time of the air/fuel ratio feedback control can be reduced to shorten the time period, for which the feedback correction coefficient FAF is restored to the proper value after the restarting of the air/fuel ratio feedback control, far more than the prior art thereby to reduce the deviation in the air/fuel ratio after the restarting of the air/fuel ratio feedback control.

[Fifth Embodiment]

A fifth embodiment of the invention will be described with reference to FIG. 12 and FIGS. 13A to 13D. In this fifth embodiment, the initial value of the feedback correction coefficient FAF at the time of restarting the air/fuel ratio feedback control from the stopping state of the air/fuel ratio feedback control is switched according to the temperature in the engine compartment.

In the air/fuel ratio control program of FIG. 12, the processes (i.e., the operations at the time when the feedback execution conditions hold) in Steps 401 to 409 are identical to those of Steps 301 to 309 of FIG. 10, and their description will be omitted.

When it is decided at Step 401 that the feedback execution conditions fail to hold, the air/fuel ratio feedback control is stopped. In this case, the routine advances to Step 410, at which the engine compartment temperature Teg is decided by the same method as that of Step 110 of FIG. 6. After this, at Step 411, the engine compartment temperature Teg is compared with the preset hot side determination value KGTEH (e.g., the temperature set within a range of 80 to 90° C.). When the engine compartment temperature Teg is higher than the hot side determination value KGTEH, the routine advances to Step 413, at which the feedback correction coefficient FAF is set to a first preset value KGINH, and the present program is ended.

When the engine compartment temperature Teg is at or lower than the hot side determination value KGTEH, on the contrary, the routine advances to Step 412, at which the engine compartment temperature Teg is compared with a preset cold side decision temperature KGTEL (e.g., the temperature set within a range of 40 to 60° C.). If Teg>KGTEL, the routine advances to Step 414, at which the feedback correction coefficient FAF is set to a second preset value KGINL. If Teg≦KGTEL, the routine advances to Step 415, at which the feedback correction coefficient FAF is set to "1.0", and this program is ended.

When the air/fuel ratio feedback control is then restarted, the feedback correction coefficient FAF takes the following initial values:

(1) the first set value KGINH for Teg>KGTEH;
(2) the second set value KGINL for KGTEH≧Teg >KGTEL; and
(3) "1.0" for Teg ≦KGTEL.

The functions and effects of the fifth embodiment thus far described will be described with reference to FIGS. 13A to 13D. FIGS. 13A to 13D illustrate the behaviors of the air/fuel ratio control at a hot time of the engine compartment. In the fifth embodiment, the feedback correction coefficient FAF is switched into three steps according to the engine compartment temperature Teg when the air/fuel ratio feedback control is stopped. This can reduce the deviation between the initial value and the proper value of the feedback correction coefficient FAF at the time of restarting the air/fuel ratio feedback control and accordingly the deviation of the air/fuel ratio after the restarting of the air/fuel ratio feedback control.

Here in this fifth embodiment, at the stopping time of the air/fuel ratio feedback control, the feedback correction coefficient FAF is switched into the three steps in accordance with the engine compartment temperature Teg but may be switched into two or four or more steps. In place of the processes in Steps 411 to 415, moreover, a map or functional equation of the feedback correction coefficient FAF employing the engine compartment temperature Teg as the parameters may be prepared and stored in the ROM 51 so that the feedback correction coefficient FAF may be calculated by the map or functional equation in accordance with the engine compartment temperature Teg, as decided at Step 410.

The second to fifth embodiments thus far described may be practiced either solely or in combination of them.

Here, the invention should not be limited to the system having the fuel supply system of the returnless piping construction but could be applied to a fuel supply system in which the excess fuel is returned from the delivery pipe 26 to the fuel tank 20.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A control apparatus for an internal combustion engine for controlling an air/fuel ratio of an exhaust gas in such a manner that the air/fuel ratio conforms to a target air/fuel ratio, said control apparatus comprising:

learning means for learning a deviation of an actual air/fuel ratio from the target air/fuel ratio;

backup memory means for backing up a learned value of said deviation learned by said learning means;

temperature determining means for determining a temperature in an engine compartment; and learning control means for prohibiting backing up said learned value when said engine compartment temperature is higher than a predetermined temperature.

2. A control apparatus for an internal combustion engine according to claim 1, wherein;

said learning means learns said deviation according to said engine compartment temperature; and said learned value corresponding to said engine compartment temperature is utilized for determining a fuel injection amount of the engine.

3. A control apparatus for an internal combustion engine according to claim 1, wherein;

said control apparatus includes feedback correction coefficient determining means for determining a feedback correction coefficient utilized for an air/fuel ratio feedback control which conforms the air/fuel ratio to the target air/fuel ratio;

said control apparatus includes memory means for renewing and storing said feedback correction coefficient; and said conrtol apparatus prohibits to reset said stored feedback correction coefficient when said engine compartment temperature is higher than said predetermined temperature.

4. A control apparatus for an internal combustion engine according to claim 1, wherein an initial feedback correction coefficient is determined according to said engine compartment temperature when an air/fuel ratio feedback control is restarted.

5. A control apparatus for an internal combustion engine according to claim 1, wherein a fuel supply system of the engine includes a returnless pipe structure.

6. A method for controlling the air/fuel ratio of an internal combustion engine exhaust gas in such a manner that the air/fuel ratio conforms to a target air/fuel ratio, said control method comprising:

determining the deviation of actual air/fuel ratio from a target air/fuel ratio; and storing the determined deviation in a backup memory unless engine compartment temperature is higher than a predetermined temperature.

7. A control method for an internal combustion engine as in claim 6 wherein:

said deviation is determined and stored as a function of engine compartment temperature; and a stored value of deviation corresponding to engine compartment temperature is utilized for determining fuel injection for the engine.

8. A control method for an internal combustion engine as in claim 6 wherein:

a feedback correction coefficient is determined and utilized for air/fuel ratio feedback control which conforms the air/fuel ratio to a target air/fuel ratio;

said feedback correction coefficient is renewed and stored; and said stored feedback correction coefficient is not reset when said engine compartment temperature is higher than said predetermined temperature.

9. A control method for an internal combustion engine as in claim 6 wherein an initial feedback correction coefficient is determined according to said engine compartment temperature when air/fuel ratio feedback control is restarted.

10. A control method for an internal combustion engine as in claim 6 wherein a fuel supply system of the engine includes a returnless pipe structure.

* * * * *

UNITED STATES PATENT AND TRADEMARK OFFICE
CERTIFICATE OF CORRECTION

PATENT NO. : 6,283,106 B1
DATED : September 4, 2001
INVENTOR(S) : Kadowaki et al.

It is certified that error appears in the above-identified patent and that said Letters Patent is hereby corrected as shown below:

Title page,
After data Item [22], insert:

-- RELATED APPLICATION DATA

[63] Division of application No. 09/149,594, filed on September 8, 1998, now U.S. Patent No. 6,026,794 issued February 22, 2000. --

Column 1,
Before line 6, insert:

-- This is a divisional of application Serial No. 09/149,594, filed September 8, 1998, now allowed, the entire content of which is hereby incorporated by reference in this application. --

Signed and Sealed this

Twenty-sixth Day of February, 2002

*Attest:*

*Attesting Officer*

JAMES E. ROGAN
*Director of the United States Patent and Trademark Office*